US012657934B2

(12) United States Patent
Kawaharada et al.

(10) Patent No.: US 12,657,934 B2
(45) Date of Patent: Jun. 16, 2026

(54) STOP LINE DETECTION APPARATUS

(71) Applicants: TOYOTA JIDOSHA KABUSHIKI KAISHA, Toyota (JP); DENSO CORPORATION, Kariya (JP)

(72) Inventors: Makoto Kawaharada, Susono (JP); Akihiro Watanabe, Tokyo (JP); Hiroaki Shimizu, Susono (JP); Ichiro Matsuyama, Kawasaki (JP); Masaki Kishimoto, Tokyo (JP); Masamichi Ohsugi, Sunto-gun (JP); Masateru Udate, Tokyo (JP); Satoshi Takeyasu, Musashino (JP); Takahiro Doi, Tokyo (JP); Takashi Morimoto, Tokyo (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 405 days.

(21) Appl. No.: 18/182,690

(22) Filed: Mar. 13, 2023

(65) Prior Publication Data

US 2023/0290160 A1 Sep. 14, 2023

(30) Foreign Application Priority Data

Mar. 14, 2022 (JP) ................................. 2022-038959

(51) Int. Cl.
*G06V 20/56* (2022.01)
*G06V 20/58* (2022.01)

(52) U.S. Cl.
CPC .......... *G06V 20/588* (2022.01); *G06V 20/584* (2022.01)

(58) Field of Classification Search
CPC .. G06V 20/588; G06V 20/584; G06V 20/582; G06V 20/56; G06V 20/58;
(Continued)

(56) References Cited

U.S. PATENT DOCUMENTS 9,105,190 B2 8/2015 Akiyama
9,393,960 B2 7/2016 Kodaira
(Continued)

FOREIGN PATENT DOCUMENTS

| JP | 2007066003 A | | 3/2007 |
| JP | 2018147353 A | * | 9/2018 |
| JP | 6742262 B2 | | 8/2020 |

OTHER PUBLICATIONS

JP-2018147353-A—english translation (Year: 2018).*
(Continued)

*Primary Examiner* — Sumati Lefkowitz
*Assistant Examiner* — Aaron Joseph Sorrin
(74) *Attorney, Agent, or Firm* — Dinsmore & Shohl LLP

(57) ABSTRACT

A stop line detection apparatus recognizes a boundary line of a lane on which the host vehicle travels, and detect a stop line at an intersection in front of the host vehicle. The apparatus sets an intersection area corresponding to the intersection in the road on which the host vehicle travels on the basis of a captured image by a front camera of the host vehicle, detects a crosswalk in the intersection area, a stop line search area setting unit configured to set a stop line search area extending from the crosswalk toward a front side in the lane on which the host vehicle travels, and performs stop line detection in the stop line search area. A depth of the stop line search area in an extending direction of a traveling lane is smaller than twice a depth of the crosswalk.

2 Claims, 8 Drawing Sheets

(58) Field of Classification Search
CPC ............. B60W 40/06; B60W 2552/53; B60W 2420/403; B60R 1/24; B60R 2300/804; G08G 1/167; G08G 1/09623; G06T 2207/30256
See application file for complete search history.

(56) References Cited

U.S. PATENT DOCUMENTS

| | | | | |
|---|---|---|---|---|
| 9,459,623 | B1* | 10/2016 | Raghu | ............. B60W 30/18154 |
| 9,483,945 | B2 | 11/2016 | Okita | |
| 9,873,412 | B2 | 1/2018 | Moriizumi | |
| 10,793,147 | B2 | 10/2020 | Kaminade | |
| 2021/0061309 | A1 | 3/2021 | Kawanai | |
| 2021/0107521 | A1 | 4/2021 | Fujita | |
| 2021/0107528 | A1 | 4/2021 | Fujita | |
| 2021/0146956 | A1 | 5/2021 | Fujita | |
| 2021/0146958 | A1 | 5/2021 | Tanaka | |
| 2021/0182576 | A1* | 6/2021 | Kuriyama | ........ G08G 1/096725 |

OTHER PUBLICATIONS

Wendy Kelley, PE, Pennoni, Inc.; "Crosswalk Pavement Marking Standards"; https://gis.penndot.gov/BPR_PDF_FILES/Documents/LTAP/TechSheets/TS_193.pdf; Spring, 2019 (Year: 2019).*
National Academies Press, Washington, DC, 138 pages, Pavement Markings-Design and Typical Layout Details, Bruce E. Friedman, Copyright 2006.

* cited by examiner

STOP LINE DETECTION APPARATUS

TECHNICAL FIELD

The present disclosure relates to a stop line detection apparatus.

CROSS-REFERENCE TO RELATED APPLICATIONS

This application is based upon and claims the benefit of priority from Japanese Patent Application No. 2022-038959, filed on Mar. 14, 2022. The entire contents of which are incorporated herein by reference.

BACKGROUND

Conventionally, Japanese Unexamined Patent Publication No. 2007-066003 is known as a technical literature related to a stop line detection apparatus. This publication discloses that in the stop line detection apparatus that detects a stop line on a road from a captured image by a camera of a vehicle, a stop line detection area is set so as not to include a crosswalk.

SUMMARY

However, in addition to pedestrian crossings, there are various lines on the road. For example, lines include that separate various areas such as areas where route buses stop. Erroneous detection of such lines as stop lines has not been sufficiently considered.

One aspect of the present disclosure is a stop line detection apparatus configured to recognize a boundary line of a road on which a host vehicle travels and a boundary line of a lane on which the host vehicle travels on the basis of a captured image by a front camera of the host vehicle, and detect a stop line at an intersection in front of the host vehicle on the basis of the captured image. The stop line detection apparatus includes an intersection area detecting unit configured to set an intersection area corresponding to the intersection in the road on which the host vehicle travels on the basis of the captured image by the front camera, a crosswalk detecting unit configured to detect a crosswalk in the intersection area on the basis of the captured image by the front camera, a stop line search area setting unit configured to set a stop line search area extending from the crosswalk toward a host vehicle side in a traveling lane on which the host vehicle travels; and a stop line detecting unit configured to perform stop line detection in the stop line search area. A depth of the stop line search area in an extending direction of the traveling lane is smaller than twice a depth of the crosswalk.

According to the stop line detection apparatus of the one aspect of the present disclosure, the stop line search area extending from the crosswalk to the host vehicle side in the lane on which the host vehicle travels is set, and the depth of the stop line search area in the extending direction of the traveling lane is set to be smaller than twice the depth of the crosswalk, so that it is possible to avoid erroneous detection of a line or the like at a position away from the crosswalk as a stop line.

The stop line detection apparatus according to the one aspect of the present disclosure may further include a nearby traffic signal detecting unit configured to detect a nearby traffic signal that is a traffic signal closest to the host vehicle at the intersection on the basis of the captured image by the front camera, and the intersection area detecting unit may set the intersection area on the basis of a position of the nearby traffic signal.

The stop line detection apparatus according to the one aspect of the present disclosure may further include a crosswalk determining unit configured to determine whether a first crosswalk, which is the crosswalk located on a host vehicle side of the intersection, has been detected on the basis of a positional relationship between the nearby traffic signal and the crosswalk, and when the crosswalk determining unit determines that the first crosswalk has been detected, the stop line search area setting unit may set a stop line search area so as to extend from an end portion on a host vehicle side of the first crosswalk toward the host vehicle.

In the stop line detection apparatus according to the one aspect of the present disclosure, when it is not determined that the first crosswalk has been detected, the crosswalk determining unit may determine whether a second crosswalk, which is the crosswalk located on a far side of the intersection, has been detected. When the crosswalk determining unit determines that the second crosswalk has been detected, the stop line search area setting unit may set a stop line search area so as to extend toward the host vehicle from an end portion on a host vehicle side of a projected crosswalk projected by rotating the second crosswalk to a position on a host vehicle side of the center of the intersection on a lane where the host vehicle travels with the center of the intersection as a reference.

The stop line detection apparatus according to the one aspect of the present disclosure may further include a road marking detecting unit configured to detect a road marking other than the stop line between the host vehicle and the first crosswalk on the traveling lane of the host vehicle on the basis of the captured image by the front camera, and the stop line search area setting unit may set a stop line search area between the first crosswalk and the road marking.

According to the one aspect of the present disclosure, it is possible to avoid erroneous detection of a white line or the like at a position away from the crosswalk as a stop line.

DETAILED DESCRIPTION

Hereinafter, an embodiment of the present disclosure will be described with reference to the drawings.

Figure 1:
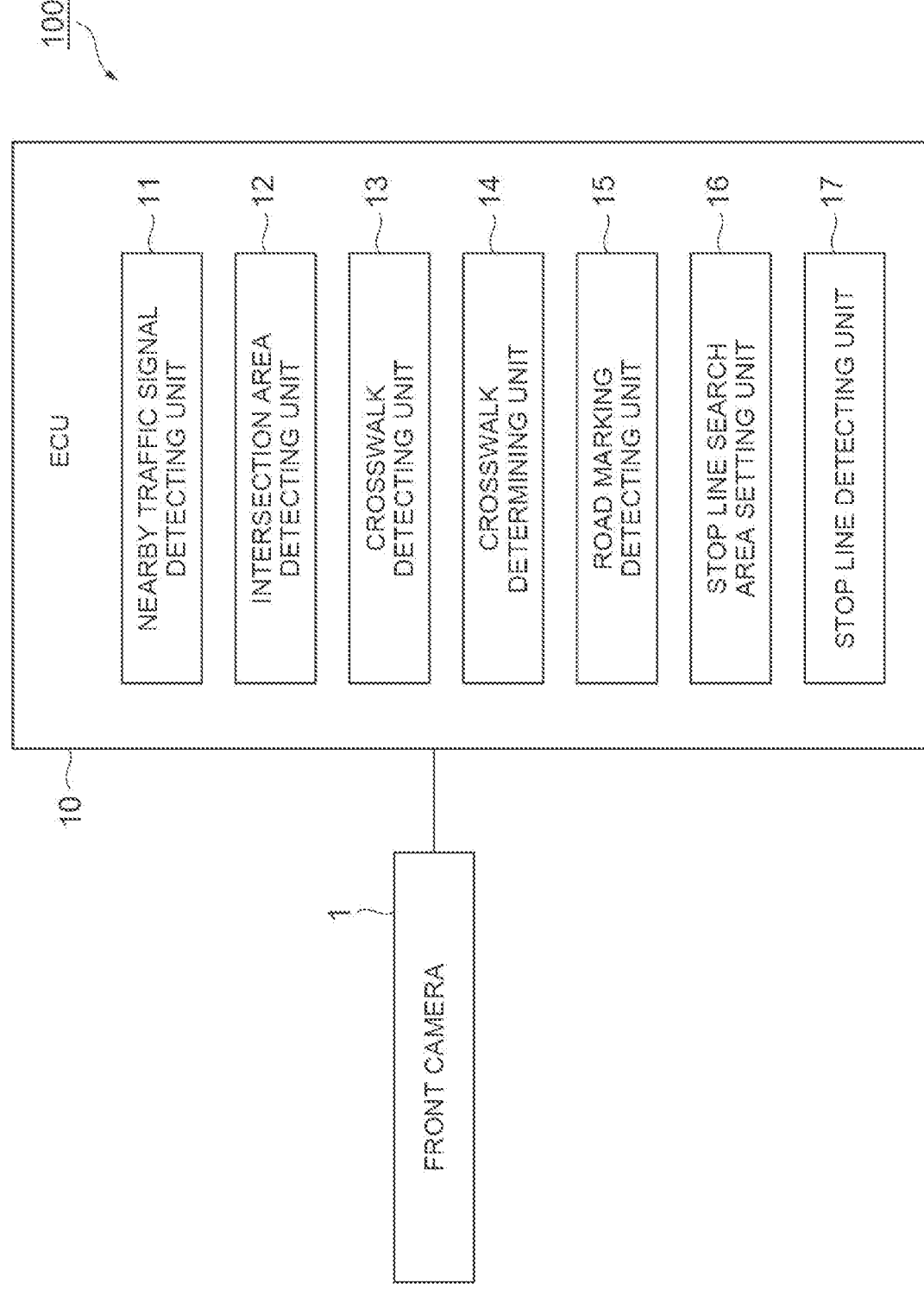
FIG. 1 is a block diagram illustrating a configuration of a stop line detection apparatus according to an embodiment.

A stop line detection apparatus 100 illustrated in FIG. 1 is an apparatus that is mounted on a vehicle (hereinafter, referred to as the host vehicle) such as a passenger car and estimates an inter-vehicle distance between the host vehicle and a preceding vehicle. The stop line detection apparatus 100 recognizes a road on which the host vehicle travels and a boundary line of a lane on which the host vehicle travels from a captured image by a front camera 1 mounted on the host vehicle, and detect a stop line at an intersection in front of the host vehicle. For boundary recognition, various known image processing methods can be adopted.

The stop line detection apparatus 100 executes stop line detection at the intersection, for example, when the host vehicle approaches the intersection. Whether the host vehicle has approached the intersection can be determined using, for example, map information including position information of the host vehicle and position information of the intersection that are acquired from a receiver of a global navigation satellite system (GNSS) mounted on the host vehicle. When a distance between the intersection in front of the host vehicle and the host vehicle becomes less than a fixed distance, the stop line detection apparatus 100 determines that the host vehicle has approached the intersection. The position information of the host vehicle is not necessarily acquired from the GNSS, and may be estimated by detection of a landmark associated with the map information (detection by the front camera 1 or a radar sensor) and dead reckoning. Whether the host vehicle has approached the intersection may be determined by other known methods.

Figure 2:
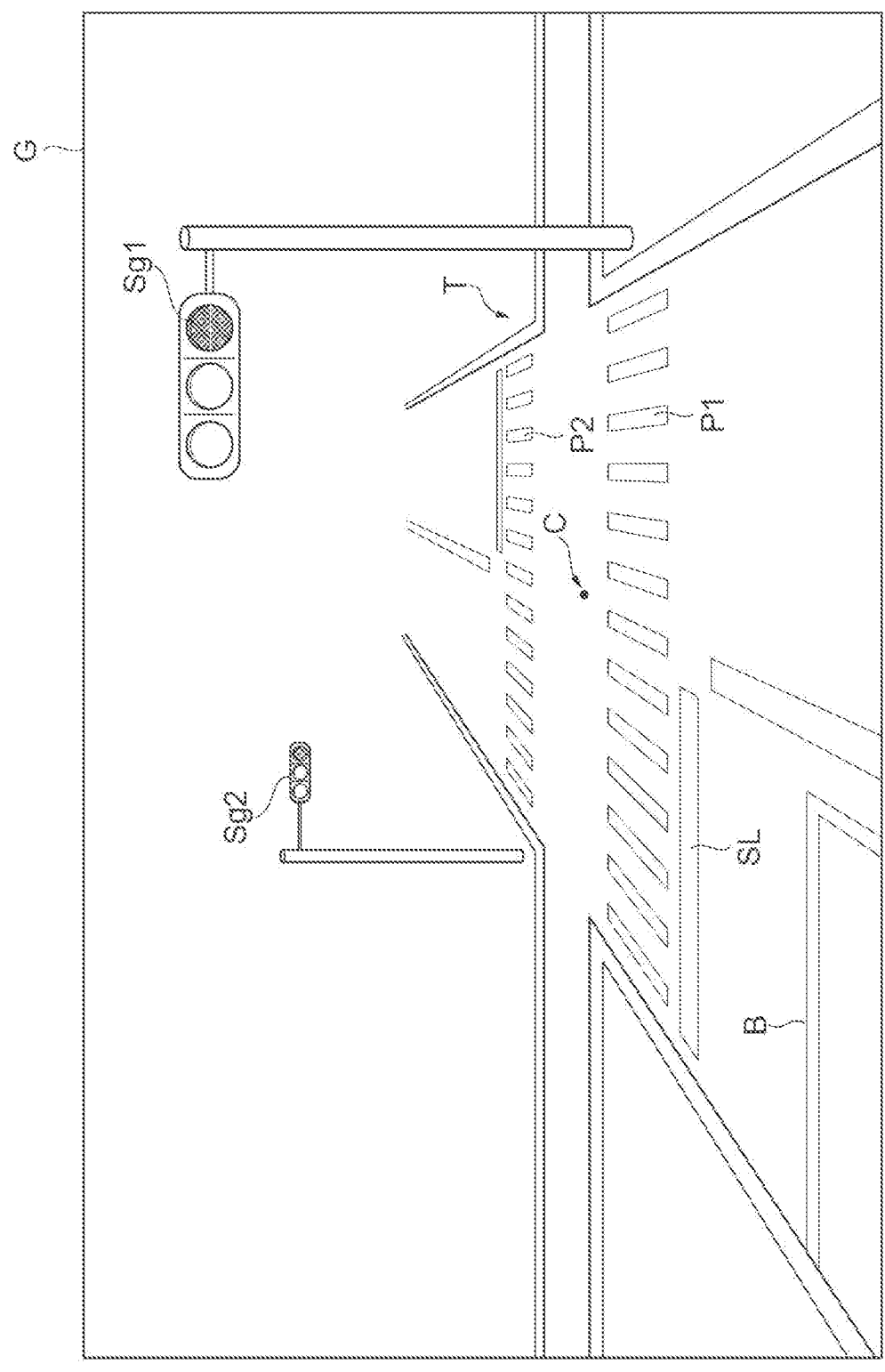
FIG. 2 is a view illustrating an example of a captured image by a front camera including an intersection.
Figure 3:
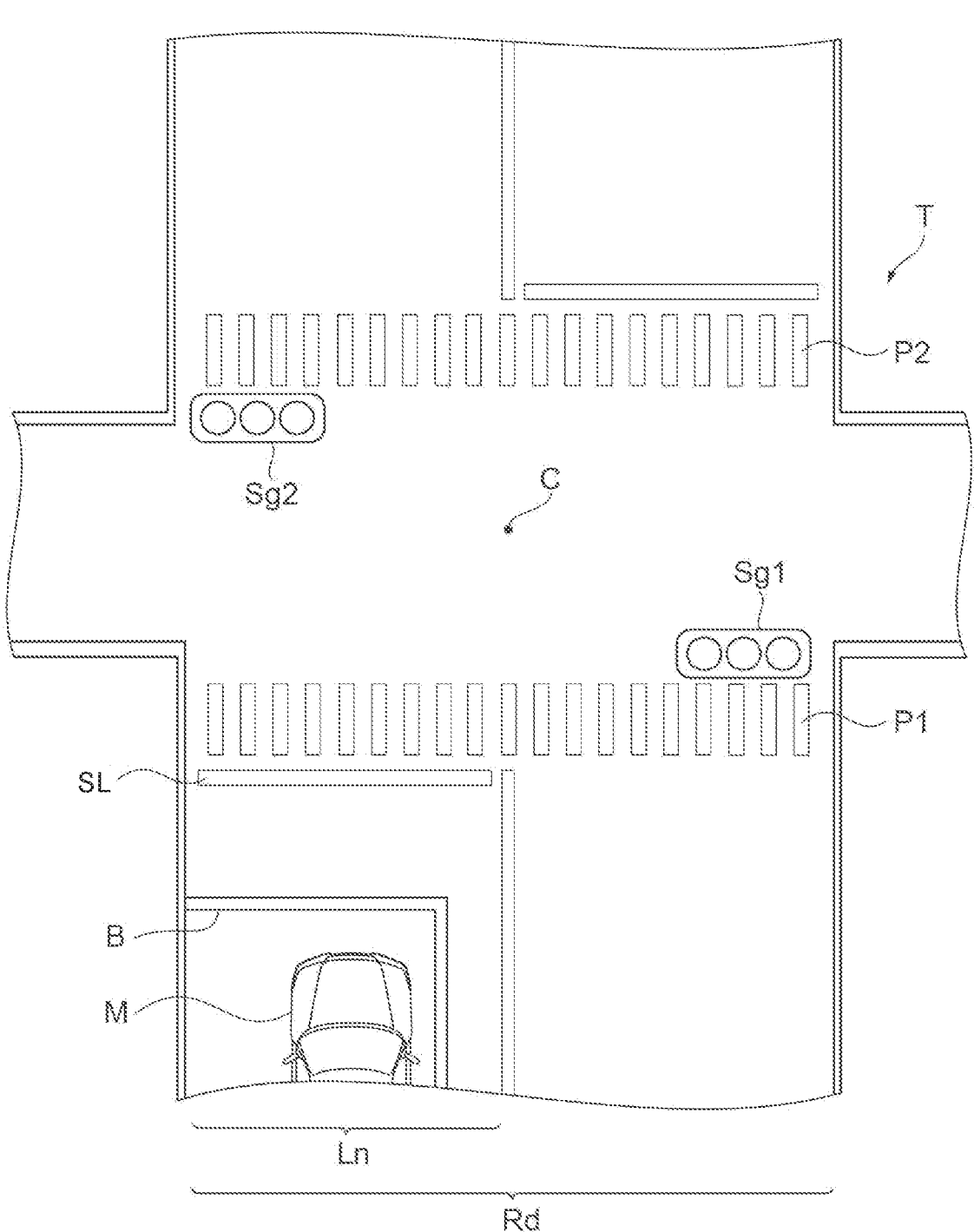
FIG. 3 is a plan view of the intersection of FIG. 2 as viewed from above.

Here, FIG. 2 is a view illustrating an example of the captured image G by the front camera 1 including the intersection T. FIG. 3 is a plan view of the intersection T of FIG. 2 as viewed from above. FIGS. 2 and 3 illustrate captured images G, the intersection T, a center C of the intersection T, traffic signals Sg1 and Sg2, a first crosswalk P1, a second crosswalk P2, the stop line SL, and a bus stop area division line B. In addition, FIG. 3 illustrates the host vehicle M, a traveling lane Ln that is a lane in which the host vehicle M travels, and a traveling road Rd that is a road on which the host vehicle M travels.

The traffic signal Sg1 is a traffic signal on a host vehicle side at the intersection T. The traffic signal Sg2 is a traffic signal on a far side (side opposite to the host vehicle M) at the intersection T. The first crosswalk P1 is a crosswalk on the host vehicle side at the intersection T. The second crosswalk P2 is a crosswalk on the far side at the intersection T. The stop line SL is a stop line on the host vehicle side of the intersection T. The bus stop area division line B is a line that is located on the host vehicle side of the intersection T and is formed on the road to define a stop area of a route bus.

In a situation as illustrated in FIGS. 2 and 3, there is a possibility that a conventional stop line detection apparatus may erroneously detect, as a stop line, a line other than the stop line SL such as the bus stop area division line B. Note that the bus stop area division line B is largely different from the stop line SL in that the bus stop area division line B is provided away from a center line. However, the bus stop area division line B may be erroneously detected as a stop line, since the stop line SL can be detected even when the stop line SL is rubbed due to damage in the stop line detection from the captured image G. On contrary to this, the stop line detection apparatus 100 according to the present embodiment reduce erroneous detection of the stop line SL by appropriately sets a stop line search area Ar.

[Configuration of Stop Line Detection Apparatus]

Hereinafter, a configuration of the stop line detection apparatus 100 according to the present embodiment will be described with reference to the drawings. As illustrated in FIG. 1, the stop line detection apparatus 100 includes an electronic control unit (ECU) 10 that integrally manages the stop line detection apparatus 100. The ECU 10 is an electronic control unit including a central processing unit (CPU) and a storage unit such as a read only memory (ROM) or a random access memory (RAM). In the ECU 10, for example, various functions are achieved by executing a program stored in the storage unit by the CPU. The ECU 10 may include a plurality of electronic units. The ECU 10 is connected to the front camera 1.

The front camera 1 is an imaging device configured to image a situation in front of the host vehicle M. The front camera 1 is provided, for example, on a back side of a windshield of the host vehicle M. The front camera 1 is, for example, a monocular camera. The front camera 1 may be a stereo camera.

A functional configuration of the ECU 10 will be described. As illustrated in FIG. 1, the ECU 10 includes a nearby traffic signal detecting unit 11, an intersection area detecting unit 12, a crosswalk detecting unit 13, a crosswalk determining unit 14, a road marking detecting unit 15, a stop line search area setting unit 16, and a stop line detecting unit 17.

The nearby traffic signal detecting unit 11 detects a nearby traffic signal Sg1 that is nearby the host vehicle M on the basis of the captured image G by the front camera 1. The nearby traffic signal Sg1 is a traffic signal closest to the host vehicle M at the intersection T. The nearby traffic signal Sg1 may be limited to a traffic signal corresponding to the traveling lane Ln of the host vehicle M. The nearby traffic signal detecting unit 11 performs nearby traffic signal detection, for example, when the host vehicle M approaches the intersection T.

The nearby traffic signal detecting unit 11 detects the traffic signals Sg1 and Sg2 in the captured image G by pattern matching using an image pattern of a traffic signal prepared in advance. The nearby traffic signal detecting unit 11 may perform traffic signal detection by deep learning. The nearby traffic signal detecting unit 11 detects the traffic signal Sg1 closest to the host vehicle M in the captured image G as a nearby traffic signal.

Specifically, the nearby traffic signal detecting unit 11 detects the traffic signals Sg1 and Sg2 by performing, for example, pattern matching on the captured image G illustrated in FIG. 2, and detects the traffic signal Sg1 located nearby the host vehicle M as a nearby traffic signal Sg1 from distance measurement using the sizes of the traffic signals Sg1 and Sg2 in the captured image G or a temporal change of the captured image G.

Alternatively, the nearby traffic signal detecting unit 11 may detect a center C of the intersection T and specify the nearby traffic signal Sg1 on the basis of a relationship with the center C of the intersection T. The center C of the intersection T can be, for example, a position of a middle point of an end portion of the center line facing across the intersection T. The center C of the intersection T may be acquired from the map information, and an acquisition method is not particularly limited.

Figure 4:
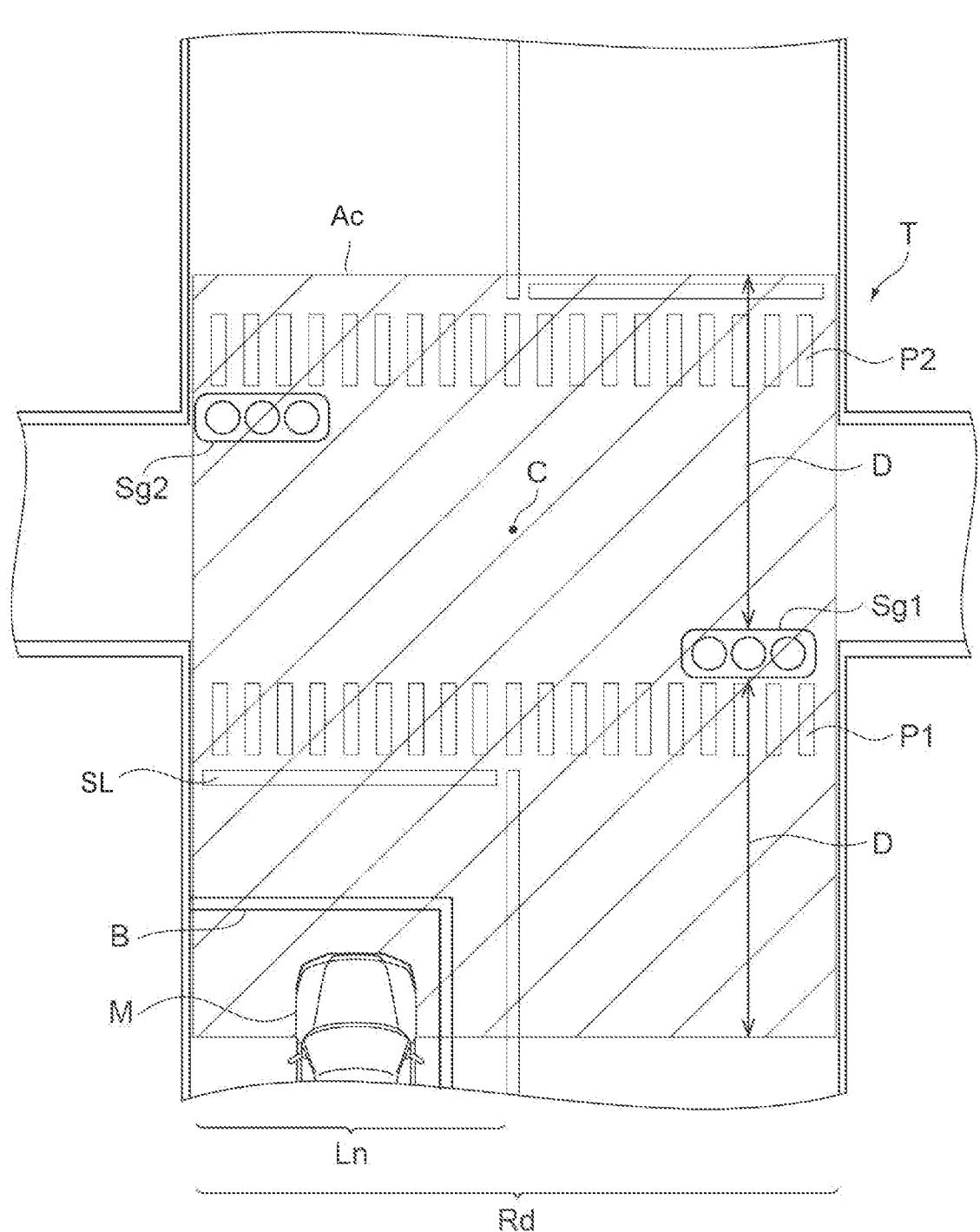
FIG. 4 is a plan view for describing an example of an intersection area.

The intersection area detecting unit 12 sets an intersection area Ac on the basis of the captured image G by the front camera 1. The intersection area Ac is an area corresponding to the intersection T in the road Rd on which the host vehicle M travels. FIG. 4 is a plan view for describing an example of the intersection area Ac. FIG. 4 illustrates an intersection area Ac.

The intersection area detecting unit 12 sets the intersection area Ac using, for example, the nearby traffic signal Sg1 detected by the nearby traffic signal detecting unit 11 on the basis of the captured image G by the front camera 1. As illustrated in FIG. 4, the intersection area detecting unit 12 sets an area within fixed distances D from the nearby traffic signal Sg1 in an extending direction of the traveling road Rd as the intersection area Ac.

The predetermined distance D may be set to a different value according to country or region. The intersection area detecting unit 12 may set different values between the predetermined distance D on the host vehicle side and the predetermined distance D on the far side in the extending direction of the traveling road Rd. For example, the predetermined distance D on the far side may be shorter than the predetermined distance D on the host vehicle side. A width of the intersection area Ac can be, for example, a width of the traveling road Rd. The width of the intersection area Ac may be a fixed value.

The crosswalk detecting unit 13 detects the first crosswalk P1 and the second crosswalk P2 in the intersection area Ac on the basis of the captured image G by the front camera 1. The crosswalk detecting unit 13 detects the first crosswalk P1 and the second crosswalk P2 by image processing such as pattern matching or deep learning. As a method for detecting the first crosswalk P1 and the second crosswalk P2, a method described in Japanese Unexamined Patent Publication No. 2007-066003 can also be employed. The crosswalk detecting unit 13 detects the first crosswalk P1 and the second crosswalk P2 from the captured image G in FIG. 2.

The crosswalk determining unit 14 determines whether the first crosswalk P1, which is the crosswalk located on the host vehicle side of the intersection T, has been detected. The crosswalk determining unit 14 determines whether the first crosswalk has been detected on the basis of, for example, a positional relationship between the nearby traffic signal Sg1 detected by the nearby traffic signal detecting unit 11 and the crosswalk P1,P2 detected by the crosswalk detecting unit 13. The crosswalk determining unit 14 may determine whether the first crosswalk P1 has been detected on the basis of a positional relationship between the center C of the intersection T and the first crosswalk P1 and a positional relationship between the center C of the intersection T and the second crosswalk P2.

The crosswalk determining unit 14 determines whether the second crosswalk P2 when the crosswalk determining unit 14 does not determine that the first crosswalk P1 has been detected. The second crosswalk P2 is the crosswalk located on the far side of the intersection T. The crosswalk determining unit 14 determines whether the second crosswalk P2 has been detected, similarly to the case of the first crosswalk P1.

The road marking detecting unit 15 detects a road marking other than the stop line SL between the host vehicle M and the first crosswalk P1 on the traveling lane Ln of the host vehicle M on the basis of the captured image G by the front camera 1. The road marking other than the stop line SL is an arrow indicating a traveling direction of the traveling lane Ln, a number indicating the maximum speed, a diamond mark indicating the presence of the first crosswalk P1, or the like. The road marking detecting unit 15 performs road marking detection by image processing such as pattern matching or deep learning.

The stop line search area setting unit 16 sets a stop line search area Ar extending from the first crosswalk P1 to the host vehicle side in the traveling lane Ln on which the host vehicle M travels. The stop line search area Ar is an area where a stop line search for detecting the stop line SL in the captured image G is performed.

First, setting of the stop line search area Ar when the crosswalk determining unit 14 determines that the first crosswalk P1 located on the host vehicle side of the intersection T has been detected will be described. When the first crosswalk P1 has been detected, the stop line search area setting unit 16 sets the stop line search area Ar with the first crosswalk P1 as a reference.

Figure 5:
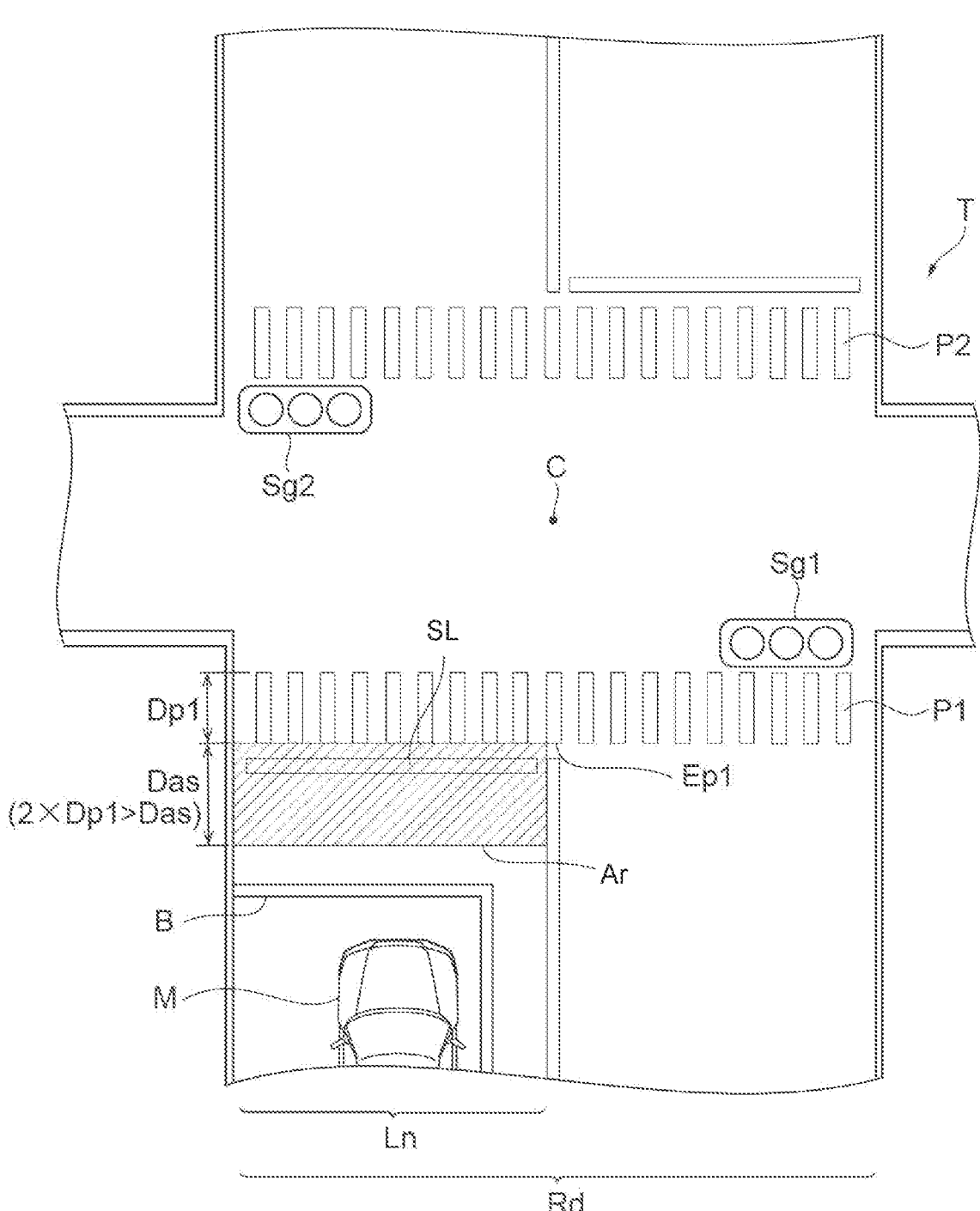
FIG. 5 is a plan view for describing an example of a stop line search area.

FIG. 5 is a plan view for describing an example of the stop line search area Ar. FIG. 5 illustrates an end portion Ep1 on the host vehicle side of the first crosswalk P1 (end portion on the host vehicle side M in the extending direction of the traveling lane Ln) and the stop line search area Ar. In addition, a depth Dp1 of the first crosswalk P1 (length in the extending direction of the traveling lane Ln) and a depth Das of the stop line search area Ar are illustrated.

As illustrated in FIG. 5, the stop line search area setting unit 16 sets the stop line search area Ar extending from the first crosswalk P1 forward the host vehicle side. A width of the stop line search area Ar can be, for example, a width of the traveling lane Ln. The width of the stop line search area Ar may be a fixed value. The stop line search area Ar is set to extend from the end portion Ep1 toward the host vehicle M with the end portion Ep1 on the host vehicle side of the first crosswalk P1 as a reference so that the stop line search area Ar does not include the first crosswalk P1.

The stop line search area setting unit 16 sets the depth Das of the stop line search area Ar in the extending direction of the traveling lane Ln so that the depth Das is smaller than twice a depth Dp1 of the first crosswalk P1 ($2{\times}Dp1{>}Das$). A minimum value of the depth Das of the stop line search area Ar may be decided. In the light of road rules of Japan, it may be expected that the stop line SL exists within a range smaller than twice the depth Dp1 of the first crosswalk P1.

When the road marking detecting unit 15 detects the road marking Rm other than the stop line SL between the host vehicle M and the first crosswalk P1 on the traveling lane Ln of the host vehicle M, the stop line search area setting unit 16 may set the stop line search area Ar between the first crosswalk P1 and the road marking Rm.

Figure 6:
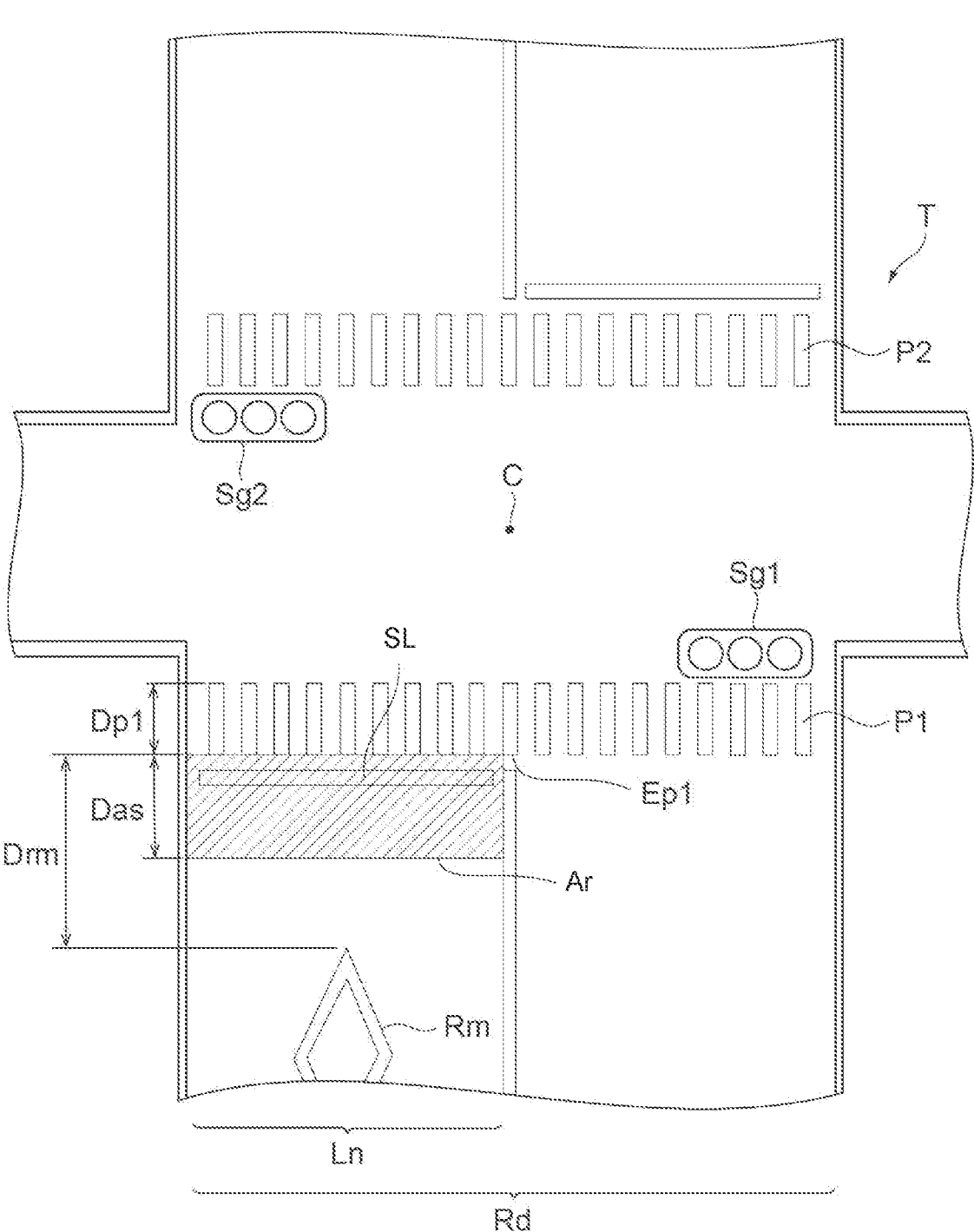
FIG. 6 is a plan view for describing when a road marking is detected.

FIG. 6 is a plan view for describing when the road marking Rm has been detected. FIG. 6 illustrates the road marking (diamond mark) Rm. When the road marking Rm has been detected, the stop line search area setting unit 16 sets the stop line search area Ar between the first crosswalk P1 and the road marking Rm in the extending direction of the traveling lane Ln. In other words, the stop line search area setting unit 16 sets the depth Das of the stop line search area Ar to be smaller than a distance Drm from the first crosswalk P1 to the road marking Rm.

Next, description will be given on setting of the stop line search area Ar when the crosswalk determining unit 14 does not determine that the first crosswalk P1 has been detected and determines that the second crosswalk P2 on the far side of the intersection T has been detected. In this case, the stop line search area setting unit 16 sets the stop line search area Ar with the second crosswalk P2 as a reference.

Figure 7:
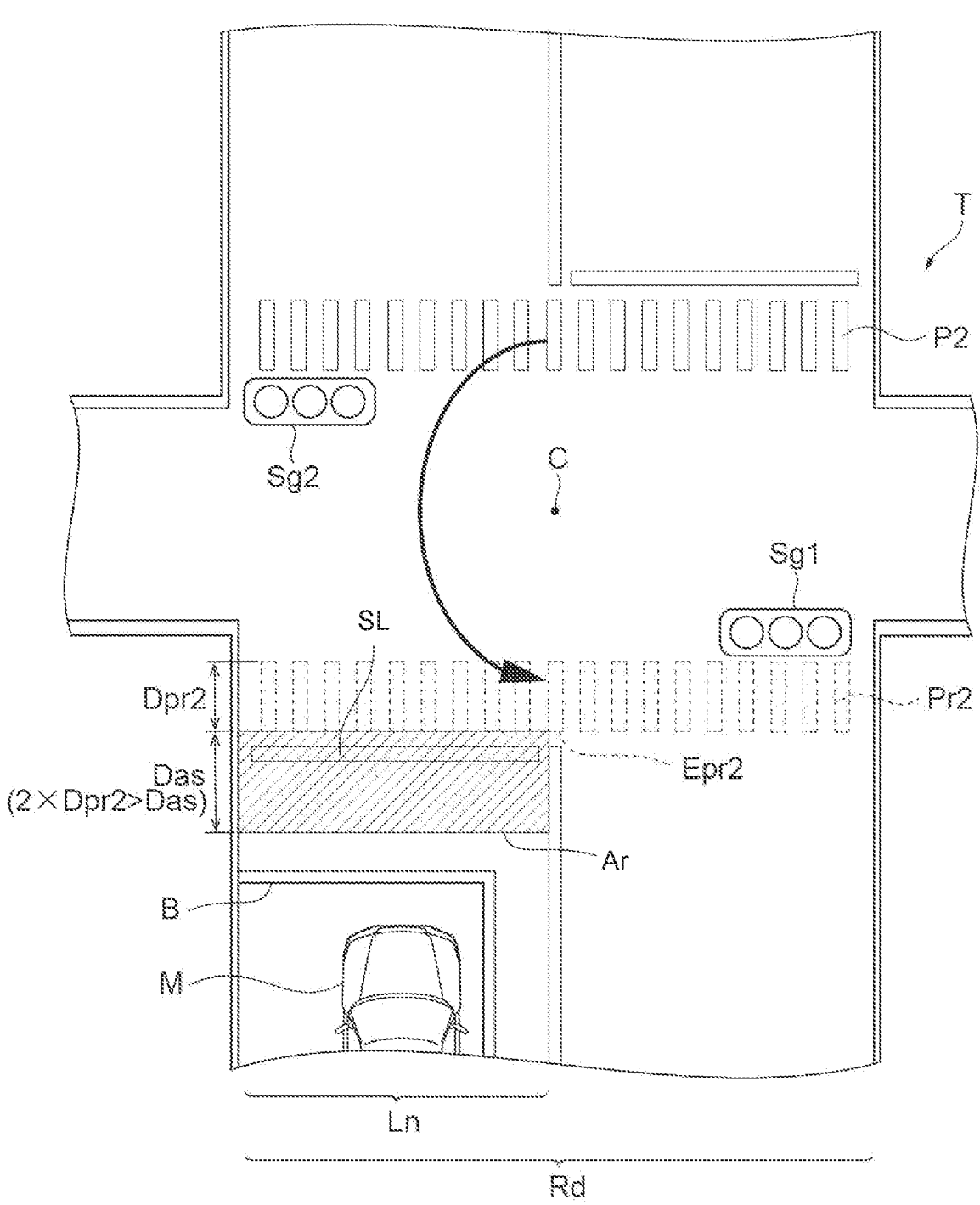
FIG. 7 is a plan view for describing another example of the stop line search area.

FIG. 7 is a plan view for describing another example of the stop line search area Ar. In FIG. 7, there is no first crosswalk P1 on the host vehicle side of the intersection T, and there is only the second crosswalk P2 on the far side of the intersection T. FIG. 7 illustrates a projection crosswalk Pr2 and an end portion Epr2 on a host vehicle side of the projection crosswalk Pr2. In addition, a depth Dpr2 of the projection crosswalk Pr2 is illustrated. The projection crosswalk Pr2 is a virtual crosswalk obtained by rotating the second crosswalk P2 to a position on a host vehicle side from the center C of the intersection T on the traveling lane Ln of the host vehicle M with the center C of the intersection T as a reference and projecting the second crosswalk P2. In a situation illustrated in FIG. 7, the projection crosswalk Pr2 may be set by rotating the second crosswalk P2 by 180° with the center C of the intersection T as a reference.

In the situation illustrated in FIG. 7, the stop line search area setting unit 16 sets (assumes) the projection crosswalk Pr2 at a position on the host vehicle side M before the intersection T on the basis of the second crosswalk P2, the center C of the intersection T, and the traveling lane Ln. The stop line search area setting unit 16 sets the stop line search area Ar extending from the projection crosswalk Pr2 toward the host vehicle side. The stop line search area setting unit 16 sets the stop line search area Ar as that does not include the projection crosswalk Pr2. The stop line search area setting unit 16 sets the stop line search area Ar so extends from the end portion Epr2 toward the host vehicle M with the end portion Epr2 on the host vehicle side of the projection crosswalk Pr2 as a reference.

The stop line search area setting unit 16 sets the depth Das of the stop line search area Ar in the extending direction of the traveling lane Ln so that the depth Das is smaller than twice the depth Dpr2 of the projection crosswalk Pr2 ($2 \times Dpr2 > Das$). Note that the depth Dpr2 of the projection crosswalk Pr2 is equal to a depth of the second crosswalk P2.

The stop line detecting unit 17 performs stop line detection in the stop line search area Ar. In situations illustrated in FIG. 5 to FIG. 7, the stop line detecting unit 17 detects the stop line SL in the stop line search area Ar by image processing such as pattern matching or deep learning. In some examples, the stop line detecting unit 17 detects the stop line SL in the stop line search area Ar. Note that when the stop line SL cannot be detected in the stop line search area Ar, the stop line detecting unit 17 may enlarge the stop line search area Ar toward the host vehicle side.

[Processing of Stop Line Detection Apparatus]

Figure 8:
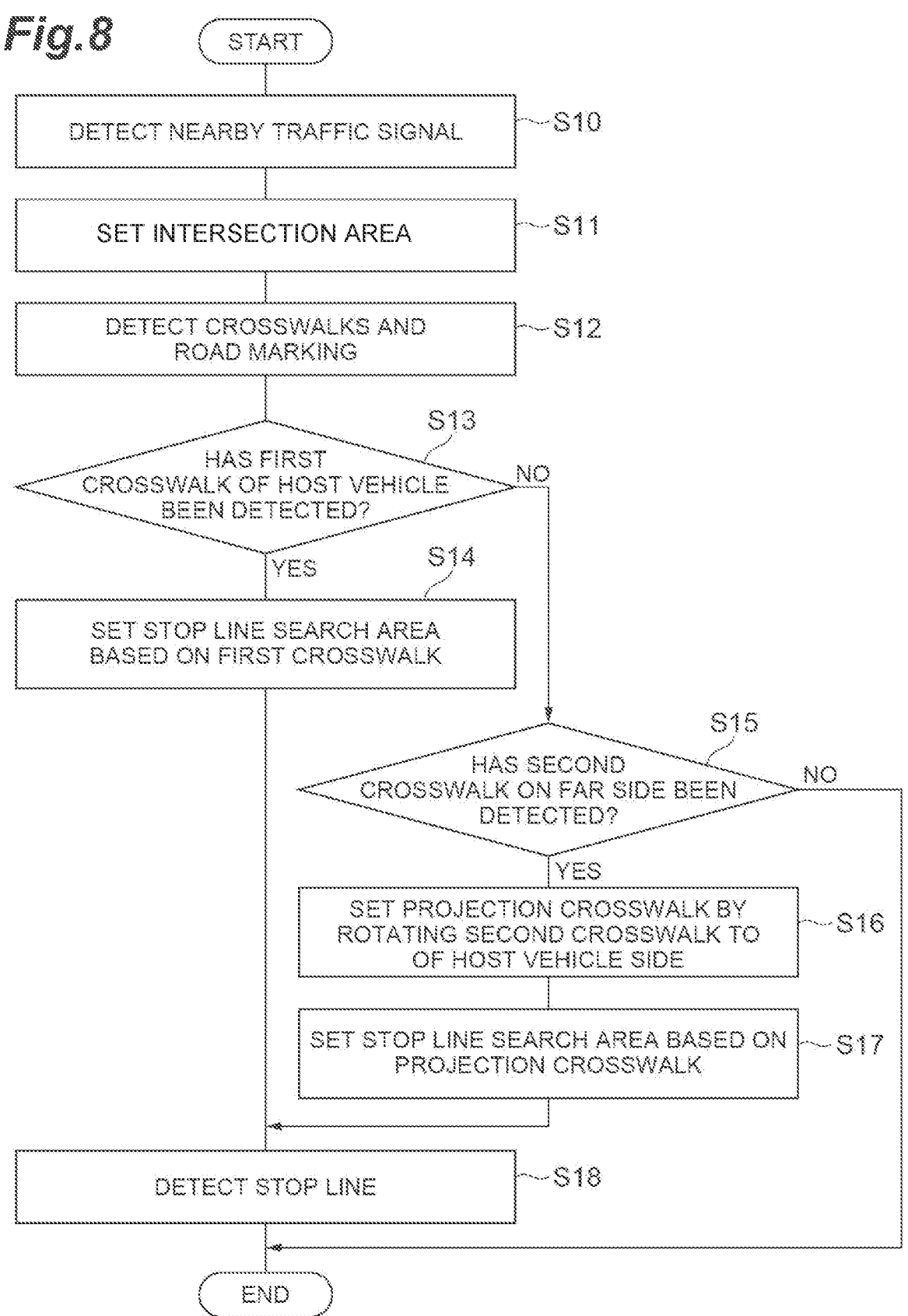
FIG. 8 is a flowchart illustrating an example of stop line detection processing.

Next, a configuration of the stop line detection apparatus 100 according to the present embodiment will be described with reference to FIG. 8. FIG. 8 is a flowchart illustrating an example of stop line detection processing. The stop line detection processing is executed, for example, when the host vehicle M approaches the intersection T.

As illustrated in FIG. 8, in S10, the ECU 10 of the stop line detection apparatus 100 causes the nearby traffic signal detecting unit 11 to detect the nearby traffic signal Sg1. The nearby traffic signal detecting unit 11 detects the nearby traffic signal Sg1 that is nearby the host vehicle M on the basis of the captured image G by the front camera 1.

In S11, the ECU 10 causes the intersection area detecting unit 12 to set the intersection area Ac. The intersection area detecting unit 12 sets an area within the predetermined distance D on the traveling road Rd as the intersection area Ac, for example, with the nearby traffic signal Sg1 as a reference.

In S12, the ECU 10 causes the crosswalk detecting unit 13 to detect the first crosswalk P1 and the second crosswalk P2 in the captured image G and causes the road marking detecting unit 15 to detect the road marking Rm. The crosswalk detecting unit 13 detects the first crosswalk P1 and the second crosswalk P2 in the intersection area Ac on the basis of the captured image G by the front camera 1. The road marking detecting unit 15 detects the road marking Rm other than the stop line SL between the host vehicle M and the first crosswalk P1 on the traveling lane Ln of the host vehicle M on the basis of the captured image G by the front camera 1. Note that the detection of the road marking Rm is not essential.

In S13, the ECU 10 causes the crosswalk determining unit 14 to determine whether the first crosswalk P1, which is the crosswalk located on the host vehicle side of the intersection T, has been detected. The crosswalk determining unit 14 determines whether the first crosswalk P1 has been detected on the basis of, for example, the positional relationship between the nearby traffic signal Sg1 detected by the nearby traffic signal detecting unit 11 and the first crosswalk P1 detected by the crosswalk detecting unit 13 and the positional relationship between the nearby traffic signal Sg1 detected by the nearby traffic signal detecting unit 11 and the second crosswalk P2 detected by the crosswalk detecting unit 13. When it is determined that the first crosswalk P1 has been detected (S13: YES), the ECU 10 proceeds to S14. When it is not determined that the first crosswalk P1 has been detected (S13: NO), the ECU 10 proceeds to S15.

In S14, the ECU 10 causes the stop line search area setting unit 16 to set the stop line search area Ar based on the first crosswalk P1. The stop line search area setting unit 16 sets the stop line search area Ar extending from the first crosswalk P1 toward the host vehicle side. As illustrated in FIG. 5, the stop line search area setting unit 16 sets the depth Das of the stop line search area Ar in the extending direction of the traveling lane Ln so that the depth Das is smaller than twice the depth Dp1 of the first crosswalk P1. Thereafter, the ECU 10 proceeds to S18.

In S15, the ECU 10 causes the crosswalk determining unit 14 to determine whether the second crosswalk P2, which is the crosswalk located on the far side of the intersection T, has been detected. The crosswalk determining unit 14 determines whether the second crosswalk P2 has been detected on the basis of, for example, the positional relationship between the nearby traffic signal Sg1 detected by the nearby traffic signal detecting unit 11 and the first crosswalk P1 detected by the crosswalk detecting unit 13 and the positional relationship between the nearby traffic signal Sg1 detected by the nearby traffic signal detecting unit 11 and the second crosswalk P2 detected by the crosswalk detecting unit 13. When it is determined that the second crosswalk P2 has been detected (S14: YES), the ECU 10 proceeds to S16. When it is not determined that the second crosswalk P2 has been detected (S14: NO), the ECU 10 ends the current stop line detection processing.

In S16, the ECU 10 causes the stop line search area setting unit 16 to set the projection crosswalk Pr2. The stop line search area setting unit 16 sets the projection crosswalk Pr2 at a position in front of the host vehicle M on the host vehicle side of the intersection T on the basis of the second crosswalk P2, the center C of intersection T and the traveling lane Ln.

In S17, the ECU 10 causes the stop line search area setting unit 16 to set the stop line search area Ar based on the projection crosswalk Pr2. The stop line search area setting unit 16 sets the stop line search area Ar extending from the projection crosswalk Pr2 toward the host vehicle side. As illustrated in FIG. 7, the stop line search area setting unit 16 sets the depth Das of the stop line search area Ar in the extending direction of the traveling lane Ln so that the depth Das is smaller than twice the depth Dpr2 of the projection crosswalk Pr2. Thereafter, the ECU 10 proceeds to S18.

In S18, the ECU 10 causes the stop line detecting unit 17 to perform stop line detection in the stop line search area Ar. The stop line detecting unit 17 detects the stop line SL in the stop line search area Ar by image processing such as pattern matching or deep learning. Thereafter, the ECU 10 ends the current stop line detection processing.

According to the stop line detection apparatus 100 according to the present embodiment described above, the stop line search area Ar extending from the first crosswalk P1 and the second crosswalk P2 toward the host vehicle side in the traveling lane Ln on which the host vehicle M travels is set, and the depth Das of the stop line search area Ar in the extending direction of the traveling lane Ln is set to be smaller than twice the depth of the crosswalk. As a result, it is possible to avoid erroneous detection of a white line or the like at a position away from the crosswalk as a stop line.

In addition, since the stop line detection apparatus 100 sets the intersection area Ac on the basis of a position of the nearby traffic signal Sg1, the intersection area Ac can be set even when the information of the intersection area Ac is not set in the map information or the like. Furthermore, when the first crosswalk P1, which is the crosswalk located on the host vehicle side of intersection T, is detected, the stop line detection apparatus 100 can set the stop line search area Ar so as to extend from the end portion Ep1 on the host vehicle side of the first crosswalk P1 toward the host vehicle M.

In addition, even when it is not determined that the first crosswalk P1 has been detected, if the second crosswalk P2, which is the crosswalk located on the far side of the intersection T, has been detected, the stop line detection apparatus 100 can set the stop line search area Ar so as to extend toward the host vehicle M from the end portion Epr2 on the host vehicle side of the projection crosswalk Pr2 obtained by rotating the second crosswalk P2 to the position on the host vehicle side from the center C of the intersection T on the traveling lane Ln of the host vehicle M with the center C of the intersection T as a reference and projecting the second crosswalk P2.

Furthermore, according to the stop line detection apparatus 100, when the road marking Rm other than the stop line SL is detected, there is a high possibility that the stop line SL exists between the first crosswalk P1 and the road marking Rm. Therefore, the stop line SL can be appropriately detected by setting the stop line search area Ar between the first crosswalk P1 and the road marking Rm.

It is to be understood that not all aspects, advantages and features described herein may necessarily be achieved by, or included in, any one particular example. Indeed, having described and illustrated various examples herein, it should be apparent that other examples may be modified in arrangement and detail.

The stop line detection apparatus 100 does not necessarily need to determine approach of the host vehicle M to the intersection T. The stop line detection apparatus 100 may start stop line detection at the intersection T from other conditions, or may constantly repeat the stop line detection at the intersection T.

The intersection area detecting unit 12 does not necessarily set the intersection area Ac with the nearby traffic signal Sg1 as a reference. The intersection area Ac may be preset on a map for each intersection. The intersection area Ac may be set as an area within a range of a fixed distance with the center C of the intersection T as a reference. In this case, the ECU does not need to include the nearby traffic signal detecting unit 11.

The ECU 10 of the stop line detection apparatus 100 does not necessarily have the crosswalk determining unit 14. When a plurality of crosswalks has been detected, the ECU 10 may set the stop line search area Ar assuming that a frontmost crosswalk is a first crosswalk P1. In this case, the SL13 and the S15 to S17 in the flowchart of FIG. 8 are unnecessary.

The ECU 10 of the stop line detection apparatus 100 does not necessarily have the road marking detecting unit 15. The stop line search area setting unit 16 may set the stop line search area Ar without considering the road marking Rm other than the stop line SL between the host vehicle M and the first crosswalk P1 on the traveling lane Ln of the host vehicle M. In this case, it is not necessary to perform road marking detection in S12 of the flowchart of FIG. 8.

What is claimed is:

1. A stop line detection apparatus configured to recognize a boundary line of a road on which a host vehicle travels and a boundary line of a lane on which the host vehicle travels on the basis of a captured image by a front camera of the host vehicle, and detect a stop line at an intersection in front of the host vehicle on the basis of the captured image, the stop line detection apparatus comprising an electronic control unit, the electronic control unit comprising a central processing unit and a memory and being configured to:

set an intersection area corresponding to the intersection in the road on which the host vehicle travels on the basis of the captured image by the front camera;

detect a nearby traffic signal that is a traffic signal closest to the host vehicle at the intersection on the basis of the captured image by the front camera;

set the intersection area on the basis of a position of the nearby traffic signal;

determine whether a first crosswalk located on a host vehicle side of the intersection has been detected on the basis of the captured image by the front camera;

when it is determined that the first crosswalk has been detected, set a stop line search area so as to extend from an end portion on the host vehicle side of the first crosswalk toward the host vehicle;

when it is not determined that the first crosswalk has been detected, determine whether a second crosswalk located on a far side of the intersection has been detected on the basis of the captured image by the front camera;

when it is determined that the second crosswalk has been detected, set the stop line search area so as to extend toward the host vehicle from an end portion on the host vehicle side of a projection crosswalk projected by rotating the second crosswalk to a position on the host vehicle side from a center of the intersection on a traveling lane of the host vehicle with the center of the intersection as a reference; and perform stop line detection in the stop line search area, wherein a depth of the stop line search area in an extending direction of the traveling lane is smaller than twice a depth of the first crosswalk.

2. The stop line detection apparatus according to claim 1, the electronic control unit being further configured to:

when the first crosswalk is detected, detect a road marking other than the stop line between the host vehicle and the first crosswalk on the traveling lane of the host vehicle on the basis of the captured image by the front camera, and when the road marking other than the stop line is detected and the first crosswalk is detected, set the stop line search area between the first crosswalk and the road marking.

* * * * *